United States Patent
Lo et al.

(10) Patent No.: US 9,383,835 B2
(45) Date of Patent: Jul. 5, 2016

(54) MULTI-FUNCTIONAL TOUCH PEN

(71) Applicant: PEGATRON CORPORATION, Taipei (TW)

(72) Inventors: Yuan-Chieh Lo, Taipei (TW); Ho-Ching Huang, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 182 days.

(21) Appl. No.: 14/273,662

(22) Filed: May 9, 2014

(65) Prior Publication Data

US 2014/0333588 A1    Nov. 13, 2014

(30) Foreign Application Priority Data

May 10, 2013    (TW) .............................. 102116714 A

(51) Int. Cl.
*G06F 3/0354*    (2013.01)

(52) U.S. Cl.
CPC .................................. *G06F 3/03545* (2013.01)

(58) Field of Classification Search
CPC ... G06F 3/03545; G06F 3/0383; G06F 3/044; G06F 3/033; G06F 3/0354; G06F 1/1626; B43K 21/02
See application file for complete search history.

(56) References Cited

U.S. PATENT DOCUMENTS

2004/0125089 A1*    7/2004    Chao et al. ..................... 345/179
2011/0175854 A1*    7/2011    Lien et al. ..................... 345/179

* cited by examiner

*Primary Examiner* — Amare Mengistu
*Assistant Examiner* — Sarvesh J Nadkarni
(74) *Attorney, Agent, or Firm* — McClure, Qualey & Rodack, LLP

(57) ABSTRACT

The disclosure provides a stylus comprising a first barrel, a second barrel, a first electromagnetic touch module and a capacitive touch module. The first electromagnetic touch module is disposed inside the first barrel. The second barrel is detachably sleeved to the outside of the first barrel and is of metallic material. When the first barrel is located inside the second barrel, the second barrel wraps the first barrel and the first electromagnetic touch module is shielded by the second barrel made of metal. When the second barrel and the first barrel are interlaced, the first electromagnetic touch module is exposed outside the second barrel. In addition, the second barrel has a capacitive touch end. The capacitive touch module is disposed corresponding to the capacitive touch end and has an electrical connection portion capable of being electrically connected to the capacitive touch end of the second barrel.

10 Claims, 5 Drawing Sheets

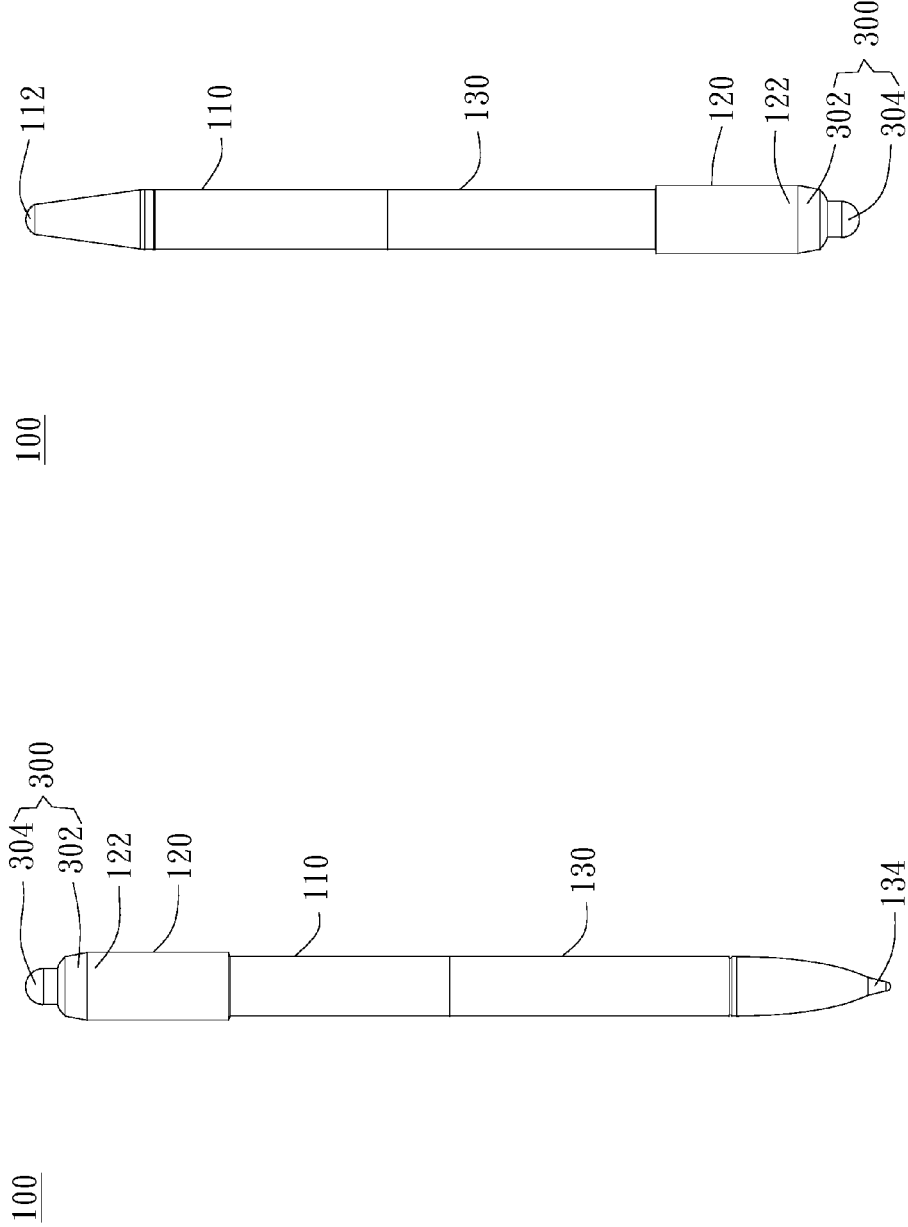

MULTI-FUNCTIONAL TOUCH PEN

CROSS-REFERENCE TO RELATED APPLICATIONS

This Non-provisional application claims priority under 35 U.S.C. §119(a) on Patent Application No(s). 102116714 filed in Taiwan, R.O.C. on May 10, 2013, the entire contents of which are hereby incorporated by reference.

BACKGROUND OF THE INVENTION

1. Field of the Invention

This invention relates to a multi-function stylus and, more particularly, to a multi-function stylus using a retractable method or a detachable method to switch touch functions.

2. Description of the Related Art

Electronic products, such as computers, televisions and mobile communications, continuously develop towards a touchable interface of multimedia software and request, and therefore, the requests for the touch panel quickly increase and the application of more electronic products will be promoted. Recently, there are mainly five types, such as resistive type, capacitive type, electromagnetic type, surface acoustic wave type and infrared type of the touch panel technology. The operation of the touch products not only can be processed by a click or a slide of a finger but also can be processed by using a stylus to allow the touch panel to obtain a better position induction. However, the commercial stylus is sold depended on the technology which the cooperated touch panels use so that various touch electronic products a user own may use different types of styluses, such as electromagnetic type, resistive type or capacitive type. For the user, the stylus with a single function cannot be used between different touch electronic touch products so that it is necessary to increase a budget on the styluses for fitting different touch types thus to decrease the will of buying the stylus.

In another aspect, except that the developments of the resistive and capacitive touch technologies are mature, a more accurate determination for the traces of the strokes can be provided for the user who needs to write or draw by co-operating the electromagnetic touch panel with the electromagnetic stylus. However, the abovementioned resistive, capacitive and electromagnetic styluses are incompatible due to different touch methods. For example, the electromagnetic stylus needs a circuit board and an electromagnetic coil. In addition to a receiving space for structural needs, a barrel, which wraps the electromagnetic coil, needs to be a nonmetallic material for avoiding influencing the induction of the electromagnetic coil. However, a barrel and a pen nib of the capacitive stylus need to be a conductive material so as to transmit charges on the panel to the pen nib and barrel for producing a touch induction. Thus, how to overcome the conflict between the styluses with different touch functions to allow different touch functions to be combined for improving users' purchasing will becomes an issue to be resolved.

BRIEF SUMMARY OF THE INVENTION

An object of the present invention is a multi-function stylus integrating different touch functions to apply a single stylus on touch electronic products with different touch methods.

The multi-function stylus comprises a first barrel, a second barrel, a first electromagnetic touch module and a capacitive touch module. The first electromagnetic touch module is disposed inside the first barrel. The second barrel is detachably sleeved to the outside of the first barrel and is of metallic material. When the first barrel is located inside the second barrel, the second barrel wraps the first barrel and the first electromagnetic touch module is shielded by the second barrel made of metal. When the second barrel and the first barrel are interlaced, the first electromagnetic touch module is exposed outside the second barrel. In addition, the second barrel has a capacitive touch end. The capacitive touch module is disposed corresponding to the capacitive touch end and has an electrical connection portion capable of being electrically connected to the capacitive touch end of the second barrel. The multi-function stylus fully utilizes an inner space of a pen body to reduce the design cost, and the multi-function stylus further has electromagnetic, capacitive and resistive touch functions for improving the convenience of using the stylus.

BRIEF DESCRIPTION OF THE DRAWINGS

FIG. 5A and FIG. 5B are schematic diagrams showing a second barrel of a multi-function stylus disposed at different positions.

DETAILED DESCRIPTION OF THE INVENTION

The present invention provides a multi-function stylus, which is preferably cooperated with an electronic device having a touch panel. In a preferred embodiment, the multi-function stylus can be preferably applied to resistive, capacitive and electromagnetic touch electronic devices. The multi-function stylus is preferably composed of three barrels, in which there is a design of using a second barrel to wrap a first barrel so that the electromagnetic touch function and the capacitive touch function can be switched by changing a relative position of the first barrel and the second barrel. In addition, a third barrel disposed at another end of the multi-function stylus preferably has a resistive touch function. Therefore, the multi-function stylus of the present invention not only can implement different touch functions by changing the position of the barrels but also can perform the needed touch induction through different structures disposed at two ends directly.

Figure 1:
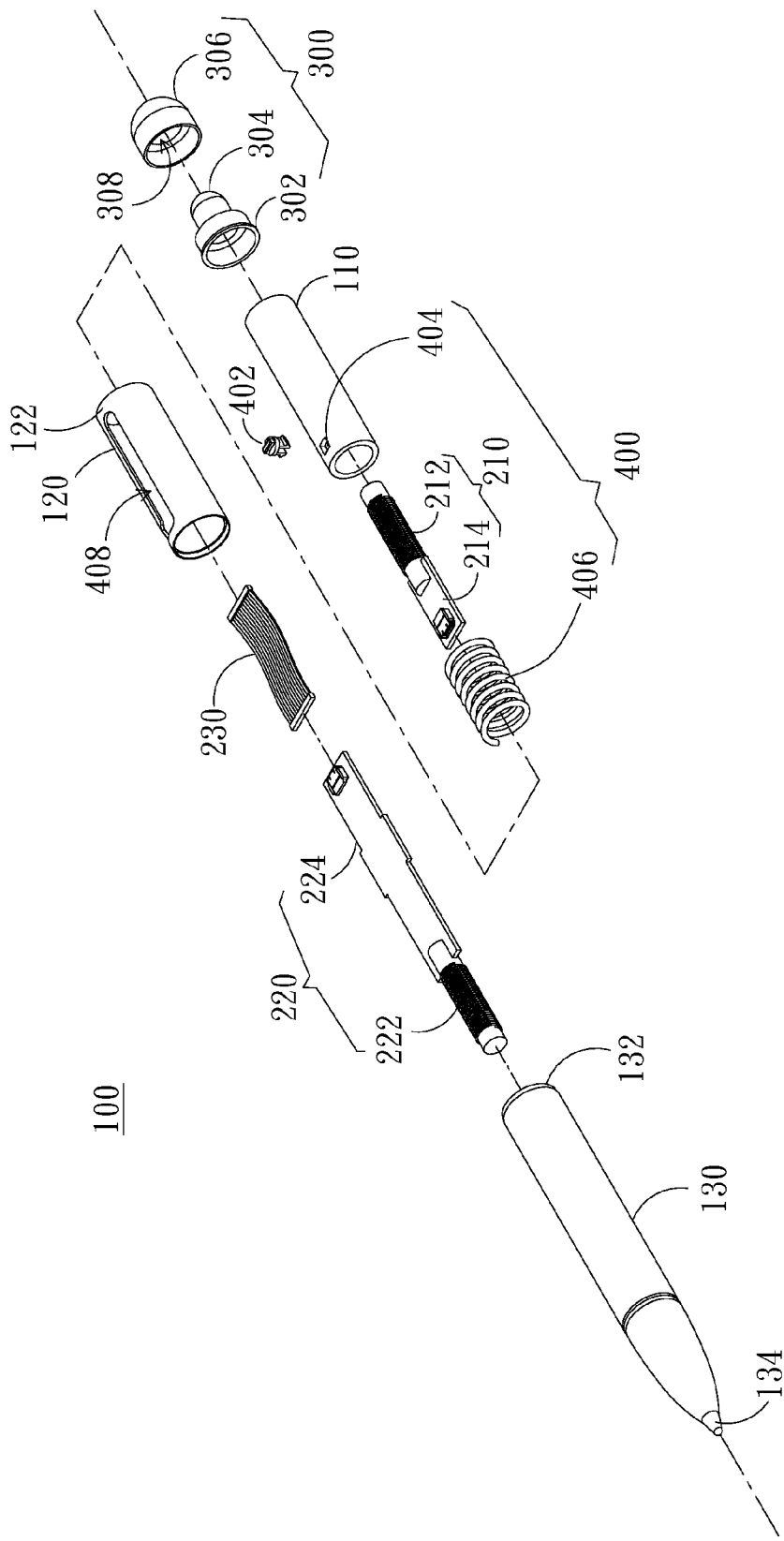
FIG. 1 is an exploded view showing an embodiment of a multi-function stylus according to the present invention.
Figure 2A:
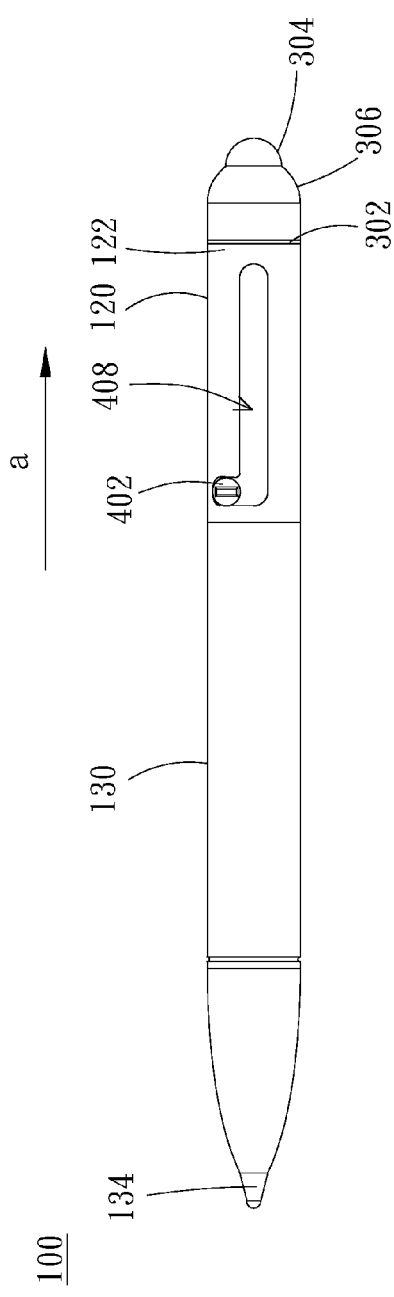
FIG. 2A and FIG. 2B are schematic diagrams showing a retractable action of a multi-function stylus.
Figure 2B:
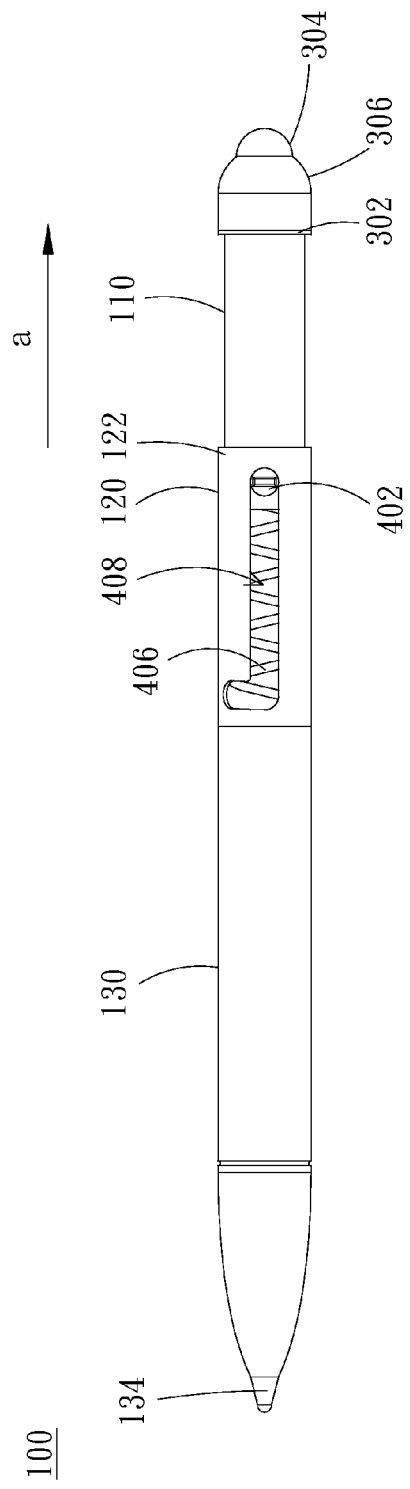

FIG. 1 is an exploded view showing an embodiment of a multi-function stylus 100 according to the present invention. As shown in FIG. 1, the multi-function stylus 100 mainly comprises a first barrel 110, a second barrel 120, a first electromagnetic touch module 210 and a capacitive touch module 300. The first electromagnetic touch module 210 is disposed inside the first barrel 110 and comprises a circuit board 214 and an electromagnetic coil 212 The second barrel 120 is detachably sleeved to the outside of the first barrel 110 and the second barrel 120 is of metallic material. That is to say, a diameter of the second barrel 120 is slightly larger than that of the first barrel 110 so that the first barrel 110 can extends into the second barrel 120 or extends out of the second barrel 120. When the first barrel 110 is located in the second barrel 120 as shown in FIG. 2A, the second barrel 120 made of metal wraps the first barrel 110 and shields reception, transmission and induction of signals of the first electromagnetic touch module 210. When the first barrel 110 protrudes out of the second barrel, the first electromagnetic touch module 210 is exposed outside the second barrel 120. When the first barrel 110 is moved along a retractable direction a with respect to the second barrel 120 as shown in FIG. 2A and FIG. 2B, a portion where the first barrel 110 does not overlap the second barrel 120 is gradually increased to allow the first barrel 110 and the second barrel 120 to be located at different positions thus to form an interlaced situation between the first barrel 110 and the second barrel 120. At this time, the first electromagnetic touch module 210 is exposed outside the second barrel 120 to form an electromagnetic touch function. In practical use, the multi-function stylus is cooperated with a touch electronic device such as a tablet. When the multi-function stylus is operated by using the electromagnetic touch function, it receives energy of an alternating current field emitted from an antenna of the tablet through a resonance circuit inside the electromagnetic touch module and then emits an electromagnetic signal to the tablet through the electromagnetic touch module. According to the abovementioned embodiment, the first electromagnetic touch module 210 can receives the energy of the alternating current field emitted from the antenna of the tablet and then emits the electromagnetic signal to the tablet.

Moreover, the second barrel 120 has a capacitive touch end 122. The capacitive touch module 300 is disposed corresponding to the capacitive touch end 122 and has an electrical connection portion 302, in which the electrical connection portion 302 is a ring-shaped structure and sleeved on the first barrel 110. An inner diameter of the electrical connection portion 302 is approximately the same as the second barrel 120. The electrical connection portion 302 is electrically connected to the capacitive touch end 122 of the second barrel 120 so that the capacitive touch module 300 is capable of being electrically conducted with the second barrel 120 to form a capacitive touch function. In addition to the electrical connection portion 302, the capacitive touch module 300 further comprises a capacitive touch contacting portion 304 and an outer cover 306. The capacitive touch contacting portion 304 is disposed on the electrical connection portion 302 and can be an electrically conductive material, such as metal or carbon fiber material. The outer cover 306 is sleeved on the capacitive touch contacting portion 304 and has a through hole 308 corresponding to the capacitive touch contacting portion 304. The outside of the capacitive touch portion 304 can be protected by the design of the outer cover 306, and it also can reduce an impact area between the capacitive touch portion 304 and a foreign object or can retard the damage of the capacitive touch module 300 resulted from an incautious drop of the multi-function stylus 100. The material of the capacitive touch contacting portion 304 can be an electrically conductible material, such as a conductive fiber cloth, so as to satisfy the needed adhered area of the panel during sensing for improving touch sensitivity.

In the other aspect, the multi-function stylus in this embodiment further comprises a third barrel 130 disposed at one end of the second barrel 120 opposite to the capacitive touch end 122 and a second electromagnetic touch module 220 disposed inside the third barrel 130. The second electromagnetic touch module 220, which comprises a circuit board 224 and an electromagnetic coil 222, is connected to the first electromagnetic touch module 210 in series through a cable 230 or a flexible circuit board, and the third barrel 130 is of plastic material. Thus, an electromagnetic touch function still can be formed even though the second electromagnetic touch module 220 is wrapped inside the third barrel 130. In addition, the third barrel 130 has a connecting portion 132 and a resistive touch end 134 opposite to the connecting portion 132. The connecting portion 132 is connected to one end of the second barrel 120 opposite to the capacitive touch end 122, and the resistive touch end 134 forms another pen nib of the multi-function stylus 100. That is, two pen nibs of the multi-function stylus 100 in this embodiment both have the touch sensing functions, in which one is capacitive or electromagnetic and another one is resistive or electromagnetic. The second electromagnetic touch module 220 can be disposed selectively and is not a necessary component in the present embodiment.

Figure 3A:
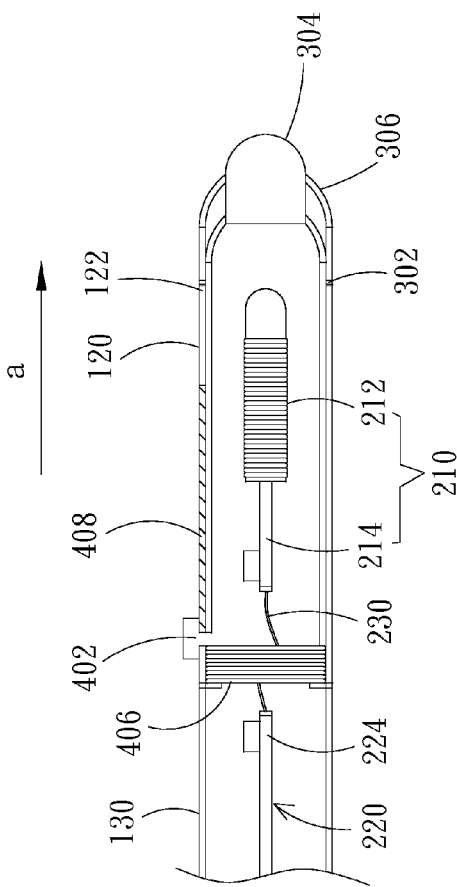
FIG. 3A and FIG. 3B are cross-sectional diagrams showing a retractable action of a multi-function stylus.

As shown in FIGS. 1-2B, the multi-function stylus 100 preferably has a retractable control module 400 comprising a tenon 402, an engaging portion 404 and an elastic member 406. The engaging portion 404 is formed on the first barrel 110 and is corresponding to the tenon 402. The elastic member 406 is disposed inside the second barrel 120. As shown in FIG. 2A and FIG. 2B, there is a groove 408 disposed at a surface of the second barrel 120 to limit a moving direction of the tenon 402. When the tenon 402, which is engaged to the first barrel 110, is guided by the groove 408 to extend outside along the retractable direction a, therefore, the first barrel 110 extends out of the second barrel 120. FIG. 2 shows that the first barrel 110 is located inside the second barrel 120 and the electrical connection portion is in contact with the second barrel 120 when the tenon 402 is located at a first position of the second barrel 120 (for example, the second barrel 120 is close to one end of the third barrel 130). Please further refer to FIG. 3A. FIG. 3A is a cross-sectional diagram showing a retractable action of the multi-function stylus 100. As shown in FIG. 3A, the tenon 402 is located at the first position and the elastic member 406 presents a compressed situation. The second barrel 120 currently wraps the first barrel 110, and the first electromagnetic touch module 210 is shielded by the second barrel 120. The capacitive touch module 300 is located at the capacitive touch end 122 of the second barrel 120. That is, the capacitive touch module 300 is electrically conducted with the capacitive touch end 122 so that the multi-function stylus 100 has the capacitive touch function.

Figure 3B:
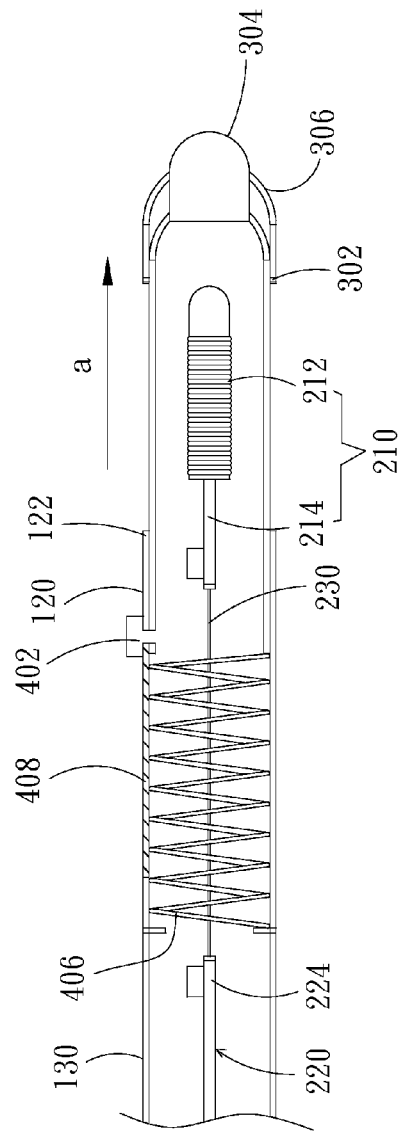

FIG. 2B shows that the first barrel 110 is pushed by the elastic member 406 to extend out of the second barrel 120 to allow the electrical connection portion 302 to be separated from the second barrel 120 when the tenon 402 is moved to a second position of the second barrel 120 (for example, a position which is closer to the capacitive touch module 300 than the first position). In this embodiment, the elastic member is a spring, and the groove 408 is preferably L-shaped. By this design, the wall of the second barrel 120 can be used to avoid the spring from elongating to allow the first barrel 110 to be inside the second barrel 120 when the tenon 402 is located at the first position, and the first barrel 110 is pushed out of the second barrel 120 along with the elongation of the spring to allow the tenon 402 to be located at the second position when the tenon 402 is pushed out from a turning position of the L-shaped. Please refer to a cross-sectional diagram of FIG. 3B. As shown in FIG. 3B, the tenon 402 is located at the second position and the elastic member presents an elongated status. The first barrel 110 extends out of the second barrel 120, and the first electromagnetic touch module 210 also extends out of a range shielded by the second barrel 120 along with the first barrel 110. The cable 230 is elongated as the first electromagnetic touch module 210 extends out of the second barrel 120. At this time, the first electromagnetic touch module 210 is located between the capacitive touch end 122 and the capacitive touch module 300 so that the capacitive touch module 300 is not electrically conducted with the capacitive touch end 122 and the multi-function stylus 100 has the electromagnetic touch function. By this design, the multi-function stylus 100 can switch the touch functions by lengthening and shortening the length of the barrel. The electromagnetic, capacitive and resistive touch functions can be integrated to implement one stylus with multipurpose and improve the practicability of the stylus.

Figure 4:
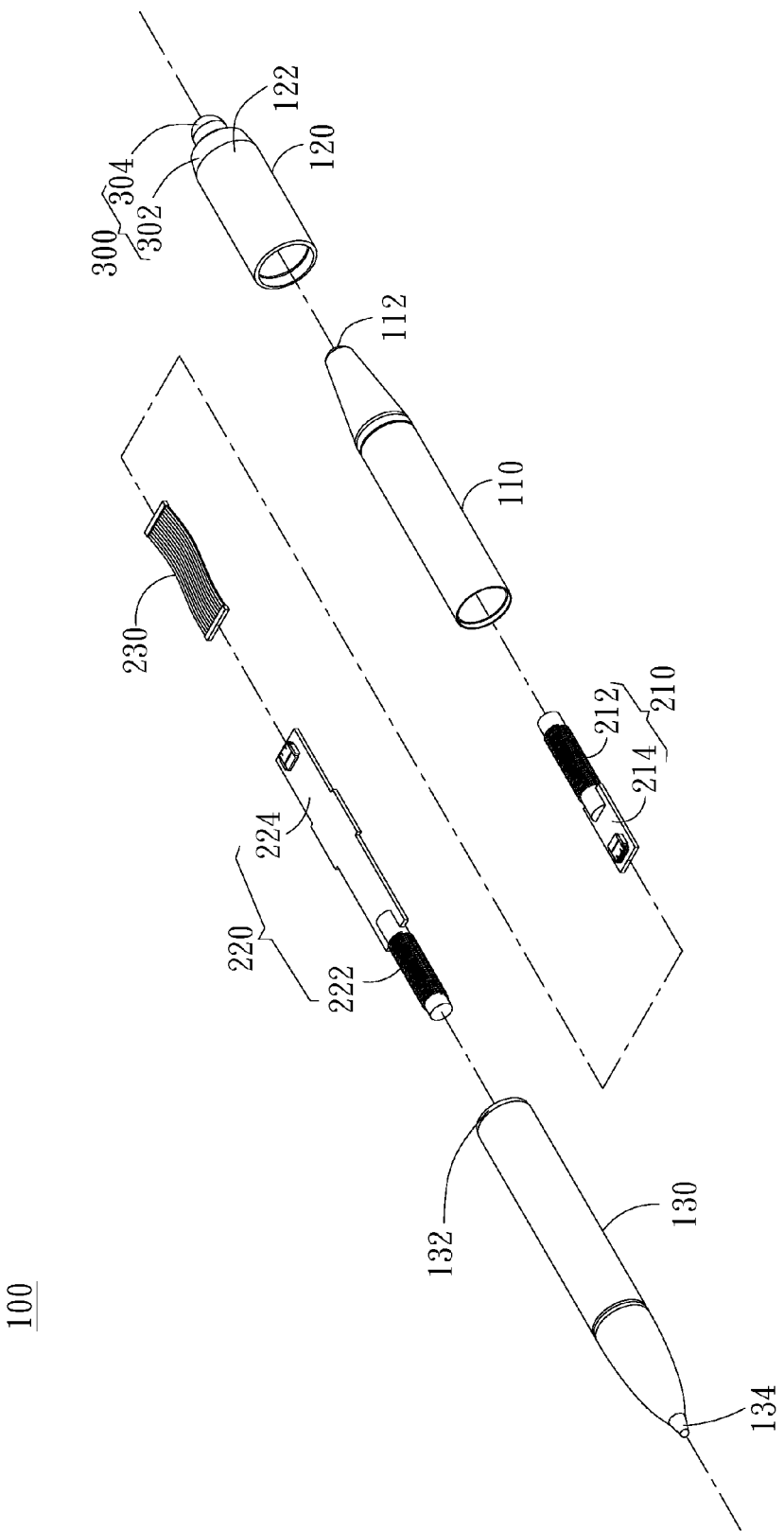
FIG. 4 is an exploded view showing another embodiment of a multi-function stylus according to the present invention.

FIG. 4 is an exploded view showing another embodiment of a multi-function stylus according to the present invention. As shown in FIG. 4, the multi-function stylus mainly comprises the first barrel 110, the second barrel 120, the first electromagnetic touch module 210 and the capacitive touch module 300. The first electromagnetic touch module 210 is disposed inside the first barrel 110 and comprises the circuit board 214 and the electromagnetic coil 212. The second barrel 120 is detachably sleeved to the outside of the first barrel 110 and is of metallic material. The first barrel 110 is capable of extending into the second barrel 120 or extending out of the second barrel 120. When the first barrel 110 is located inside the second barrel 120, the second barrel, which is made of metal, wraps the first barrel 110 and shields reception, transmission and induction of signals of the first electromagnetic touch module 300. When the first barrel 110 protrudes out of the second barrel 120, the first electromagnetic touch module 210 is exposed outside the second barrel 120. Please refer to FIG. 4 and FIGS. 5A-5B. When the first barrel 110 is moved out of the second barrel 120, the first barrel 110 and the second barrel 120 do not overlap to allow the first barrel 110 and the second barrel 120 to be located at different positions so that the first electromagnetic touch module 210 is exposed outside the second barrel 120 to form the electromagnetic touch function. In addition, the second barrel 120 has the capacitive touch end 122, and the capacitive touch module 300 is disposed corresponding to the capacitive touch end 122. The capacitive touch module 300 has the electrical connection portion 302, in which the electrical connection portion 302 has a ring-shaped structure, sleeved on the first barrel 110 and the inner diameter thereof is approximately the same as the second barrel 120. The electrical connection portion 302 is capable of being electrically connected to the capacitive touch end 122 of the second barrel 120 so that the capacitive touch module 300 can be electrically conducted with the second barrel 120 to form the capacitive touch function. Comparing to the former embodiment, the methods used to change the relative position between the first barrel 110 and the second barrel 120 are slightly different. With regard to the retractable multi-function stylus 100, the first barrel 110 extends out of the second barrel 120 from the capacitive touch end 122. With regard to the multi-function stylus 100 as shown in FIG. 4, the first barrel 110 extends out of the second barrel 120 from one end opposite to the capacitive touch end 122. The user can choose the needed type depended on an operation habit.

Moreover, the capacitive touch module 300 of this embodiment can be directly connected to the second barrel 120 without the outer cover, but the present invention is not limited thereto. The capacitive touch module 300 has not only the electrical connection portion 302 but also has a capacitive touch contacting portion 304. The capacitive touch contacting portion 304 is disposed on the electrical connection portion 302 and can be an electrically conductive material, such as metal or carbon fiber material. The material of the capacitive touch contacting portion 304 can be an electrically conductible material, such as a conductive fiber cloth, so as to satisfy the needed adhered area of the panel during sensing for improving touch sensitivity.

In the other aspect, the multi-function stylus 100 of this embodiment further comprises the third barrel 130 connected to the first barrel 110 and the second electromagnetic touch module 220 disposed inside the third barrel 130. The second electromagnetic touch module 220, which comprises a circuit board 224 and an electromagnetic coil 222, is connected to the first electromagnetic touch module 210 in series through a cable 230 or a flexible circuit board, and the third barrel 130 is of plastic material. Thus, an electromagnetic touch function still can be formed even though the second electromagnetic touch module 220 is wrapped inside the third barrel 130. In addition, the third barrel 130 has the connecting portion 132 and the resistive touch end 134 opposite to the connecting portion 132. The connecting portion 132 is connected to one end of the first barrel 110 opposite to the second barrel 120, and the resistive touch end 134 forms another pen nib of the multi-function stylus 100. That is, two pen nibs of the multi-function stylus 100 in this embodiment both have the touch sensing functions, in which one is capacitive or electromagnetic and another one is resistive or electromagnetic. The second electromagnetic touch module 220 can be disposed selectively and is not a necessary component in the present embodiment In this embodiment, the second barrel 120 detachably wraps the first barrel and also can wrap the third barrel 130. Thus, the capacitive touch module 300 wraps the resistive touch end 134 and the second electromagnetic touch module 220 is shielded by the second barrel 120 when the second barrel 120 is departed from the first barrel 110 to wrap the third barrel 130. In addition, the first barrel 110 further comprises an electromagnetic touch contacting portion 112 disposed at one end of the first barrel 110 opposite to the third barrel 130. Accordingly, the multi-function stylus 100 can utilize the electromagnetic touch contacting portion 112 to touch the surface of the touch device during the operation of the electromagnetic touch function for improving touch accuracy.

FIG. 5A and FIG. 5B are schematic diagrams showing the second barrel 120 of the multi-function stylus 100 disposed at different positions. As shown in FIG. 5A, the electromagnetic touch function of the first barrel 110 is shielded by the second barrel 120 so that there is only capacitive touch function. To shield the electromagnetic touch module, it is accordingly known that the second barrel 120 of the multi-function stylus 100 is not limited to the embodiment shown in FIG. 2A to completely wrap the first barrel therein. The multi-function stylus 100 also can be performed as shown in FIG. 5A to wrap a part of the first barrel 110 in the second barrel 120. Accordingly, the effect of shielding the electromagnetic touch function can be achieved when the present position of the electromagnetic touch module is shielded by the second barrel 120. Comparatively, the electromagnetic touch function of the third barrel 130 is shielded by the second barrel 120 so that there is only capacitive touch function when the second barrel 120 wraps the third barrel 130 as shown in FIG. 5B. By this design, the multi-function stylus 100 can combine the electromagnetic, capacitive and resistive touch functions to a single stylus and switch the touch functions according to the needs to implement one stylus with multipurpose and improve the practicability of the stylus.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A stylus, comprising:
   a first barrel;
   a second barrel movably sleeved to the outside of the first barrel and having a capacitive touch end, wherein the second barrel is of metallic material;
   a third barrel having a connecting portion connected to an end of the second barrel opposite to the capacitive touch end
   a first electromagnetic touch module disposed to the first barrel;
   a capacitive touch module having an electrical connection portion detachably electrically connected to the capacitive touch end of the second barrel;
   a second electromagnetic touch module disposed inside the third barrel, wherein the second electromagnetic touch module is connected to the first electromagnetic touch module in series through a cable and the cable is elongated to allow the first electromagnetic touch module to be away from the second electromagnetic touch module along with the first barrel when the first barrel extends out of the second barrel;
   wherein the capacitive touch module is electrically connected to the capacitive touch end of the second barrel when the second barrel wraps the first barrel and shields the first electromagnetic touch module;
   wherein the first electromagnetic touch module is exposed outside the second barrel when the first barrel protrudes out of the second barrel.

2. The stylus according to claim 1, wherein the first electromagnetic touch module is located between the capacitive touch end and the capacitive touch module when the first barrel extends out of the second barrel from the capacitive touch end of the second barrel.

3. The stylus according to claim 1, wherein the third barrel having a resistive touch end disposed opposite to the connecting portion, wherein the third barrel is of plastic material.

4. The stylus according to claim 1, wherein the capacitive touch module further comprises a capacitive touch connecting portion disposed on the electrical connection portion and an outer cover having a through hole corresponding to the capacitive touch connecting portion.

5. The stylus according to claim 1, further comprising a retractable control module including:
   a tenon;
   an engaging portion formed on the first barrel and corresponding to the tenon;
   an elastic member disposed inside the second barrel;
   wherein a groove is disposed at a surface of the second barrel to limit a moving path of the tenon, the first barrel is disposed inside the second barrel and the electrical connection portion is in contact with the second barrel when the tenon is located at a first position of the second barrel, and the first barrel is pushed by the elastic member to extend out of the second barrel and the electrical connection portion separates from the second barrel when the tenon is moved to a second position of the second barrel.

6. The stylus according to claim 1, wherein the capacitive touch module further comprises a capacitive touch connecting portion disposed on the electrical connection portion.

7. A stylus, comprising:
   a first barrel;
   a second barrel movably sleeved to the outside of the first barrel and having a capacitive touch end, wherein the second barrel is of metallic material;
   a third barrel having a connecting portion connected to an end of the first barrel opposite to the second barrel
   a first electromagnetic touch module disposed to the first barrel;
   a capacitive touch module having an electrical connection portion detachably electrically connected to the capacitive touch end of the second barrel;
   a second electromagnetic touch module disposed inside the third barrel and connected to the first electromagnetic touch module in series through a cable, wherein the capacitive touch module wraps the resistive touch end and the second electromagnetic touch module is shielded by the second barrel when the second barrel departs from the first barrel to wrap the third barrel;
   wherein the capacitive touch module is electrically connected to the capacitive touch end of the second barrel when the second barrel wraps the first barrel and shields the first electromagnetic touch module;
   wherein the first electromagnetic touch module is exposed outside the second barrel when the first barrel protrudes out of the second barrel.

8. The stylus according to claim 7, further comprising an electromagnetic touch contacting portion disposed at an end of the first barrel opposite to the third barrel.

9. The stylus according to claim 7, wherein the first electromagnetic touch module is located outside of the second barrel along with the first barrel when the first barrel extends out of the second barrel from an end of the second barrel opposite to the capacitive touch end.

10. The stylus according to claim 7, further comprising a third barrel having a resistive touch end disposed opposite to the connecting portion, wherein the third barrel is of plastic material.

* * * * *